United States Patent Office 3,308,142
Patented Mar. 7, 1967

3,308,142
PRODUCTION OF ORGANOTIN-PHOSPHORUS COMPOUNDS
Harold Coates, Wombourn, and Peter Albert Theodore Hoye, Stourbridge, England, assignors to Albright & Wilson (Mfg.) Limited, Oldbury, Warwickshire, England
No Drawing. Filed Aug. 15, 1963, Ser. No. 302,448
Claims priority, application Great Britain, Aug. 15, 1962, 31,270/62
15 Claims. (Cl. 260—429.7)

This invention relates to the production of organotin compounds, that is compounds containing at least one carbon-tin bond.

Organotin halides of the general formula $R_nSnX_{4-n}$, where each R represents a hydrocarbon or substituted hydrocarbon radical, each X represents a chlorine, bromine or iodine atom, and n is 1, 2 or 3, are commercially valuable compounds since they are among the most readily prepared of organotin compounds and from them can be prepared most of the other organotin derivatives which find widespread use as stabilizers for polymeric materials, as catalysts for polyurethane production and as fungicides. Most of such derivatives are alkyltin oxides, carboxylate esters or thio-compounds in which the alkyl group(s) bonded to the tin atom contain from 4 to 8 carbon atoms and the present invention is particularly concerned with improvements in the economic production of these compounds.

The organotin halides may themselves be prepared by the reaction of a stannic halide with certain organometallic compounds, such as Grignard reagents or organoaluminium compounds, but this is an expensive process to operate in view of the cost of the organo-metallic compounds. A much cheaper process is the direct reaction of a methyl halide with metallic tin to produce methyltin halides, but this reaction has until recently not been carried out in good yield when the methyl halide has been replaced by other alkyl halides. However, it has recently been reported (Japanese Patent No. 7,810/60 and Matsuda et al., Kogyo Kagaka Zasshi, 1961, 64(3), 541–543, translated in Bulletin of the Chemical Society of Japan, 1962, 35, 208–211) that good yields of butyltin iodides can be obtained by the direct reaction of metallic tin with butyl iodide, a small amount of stannous iodide being concurrently produced.

As stated previously, the organotin halides are usually converted for industrial purposes into other derivatives. Their conversion to organotin oxides is readily carried out by alkaline hydrolysis of the organotin halides and from the oxides the organotin esters and thio compounds may be prepared by reaction with the appropriate carboxylic acid or mercaptan. The organotin esters may, alternatively, be prepared by reaction of the alkyltin halides with a salt of the appropriate acid.

It will be noted that in all these conversions the halide value of the organotin halide is eliminated from the organotin molecule and if the halide is a bromide or iodide the process is uneconomic to operate unless the halide value can be readily recovered for re-use in the production of a further quantity of organotin halide. This is particularly necessary if the direct reaction of metallic tin with an alkyl iodide is to find commercial utilization. For most efficient recovery of the halide value it is desirable for the halide to be recovered directly in the form of the appropriate alkyl halide which can then be used for the preparation of a further quantity of Grignard reagent or, if it is an alkyl iodide, for direct reaction with a further quantity of metallic tin.

Hitherto, the iodine or bromine values in an organotin compound have been recovered by hydrolysis of the organotin halide to the corresponding oxide, which is then removed from the reaction mixture and the mother liquor chlorinated to liberate the iodine or bromine which can subsequently be used in the preparation of a further quantity of alkyl halide. However, this recovery is in itself an expensive process particularly since it does not lead directly to the recovery of the iodine or bromine in the form of the alkyl halide.

We have now found that phosphorous-containing organotin esters may be prepared by the direct reaction of an organotin halide with a trialkyl phosphate or dialkyl phosphite ester, and thus a new process for the production of such esters is provided. The direct by-product of this new process is an alkyl halide and therefore the new process also provides a new method for the recovery of the halide value of an organotin halide directly in the form of an alkyl halide, which is the most suitable form for re-use of the halide value in the production of a further quantity of organotin halide. Such a method of recovery is particularly advantageous when the organotin halide is a bromide or iodide and has the further advantage that alkyl halide is also formed by reaction between the phosphate or phosphite ester and any stannous halide present as contaminant in the organotin halide or produced during the initial reaction thereof with such ester. This recovery of halide value is so advantageous economically that it may often be more convenient to carry out the new reaction primarily to recover the halide value of the organotin halide in the form of an alkyl halide and hydrolyse the formed organotin phosphorus-containing ester to the corresponding organotin oxide rather than prepare the oxide directly by hydrolysis of the organotin halide with the result that then the halide value is not conveniently or economically recoverable in the desired form of an organic halide.

It is especially advantageous to carry out the new reaction between an alkyltin halide and a trialkyl phosphate or dialkyl phosphite ester in which the alkyl groups are identical with that or those bonded to tin in the organotin halide. In such a reaction the alkyl halide by-product is suitable for direct use in the production of a further quantity of the same alkyltin halide.

A further object of the present invention is the provision of a cyclic process for the production of an alkyltin phosphorus-containing ester by reaction of an alkyl iodide with metallic tin followed by subsequent reaction of the formed alkyltin iodide with a trialkyl phosphate or dialkyl phosphite ester wherein the alkyl groups are the same as that of the alkyl iodide so that an alkyltin ester is produced according to the new reaction with the concomitant reformation of the alkyl iodide for re-use in a reaction with a further quantity of metallic tin.

The present invention therefore provides a process for the production of an organotin phosphorus-containing ester and for the recovery of the halide value from an organotin halide, which comprises reacting an organotin halide of the general formula $R_nSnX_{4-n}$, wherein each R represents a hydrocarbon group, each X represents a chlorine, bromine or iodine atom, preferably a bromine or iodine atom, and n is 1, 2 or 3, with a trialkyl phosphate or dialkyl phosphite ester, whereby there are produced an organotin phosphorus-containing ester and an alkyl halide.

A preferred aspect of the invention is provided by a process for the recovery of the halide value from an alkyltin halide and the production of an alkyltin phosphorus-containing ester, which comprises reacting an alkyltin halide of the above general formula with a trialkyl prosphate ester of the formula $(RO)_3PO$ or a dialkyl phosphite ester of the formula $(RO)_2HPO$ wherein the alkyl groups R are identical with the group(s) R present in the said organotin halide, whereby there is produced an alkyltin phosphorus-containing ester and the halide value of the alkyltin halide is recovered as the corresponding alkyl halide (RX).

Yet a further preferred aspect of the invention is a cyclic process for the production of organotin phosphorus-containing esters, wherein metallic tin is reacted with an alkyl iodide to produce an alkyltin iodide which is subsequently reacted with a trialkyl phosphate or dialkyl phosphite ester wherein the alkyl groups present in the phosphate or phosphite ester are identical with that of the alkyl iodide, whereby an alkyltin ester is produced and a quantity of alkyl iodide is regenerated for subsequent reaction with a further quantity of metallic tin.

The terms "hydrocarbon group" and "alkyl group" as used herein are generic expressions relating to unsubstituted and substituted, saturated and unsaturated hydrocarbon or alkyl groups and, therefore, include a reference to such groups as alkenyl and cyclo-alkyl, for example cyclohexyl, groups. By the term "substituted" as used above we mean hydrocarbon or alkyl groups which contain substituents the presence of which does not interfere with the course of the reaction between the organotin halide and the phosphate or phosphite ester; such substituents include, for example, cyano, nitro, ether and thio-ether substituents.

The particular phosphate and phosphite esters for present use are sometimes termed the "neutral" esters of phosphoric and phosphorous acids. The alkyl groups in these esters may contain from 1 to 20, preferably 1 to 8, carbon atoms. The choice of alkyl group is determined to some extent by availability of the ester, but more often by the desire to recover the halide value of the organotin halide in the most preferred form. Thus it is preferred that the alkyl groups in the phosphate or phosphite ester are identical with those bonded to tin in the alkyltin halide and the present reaction is very advantageously carried out when the alkyl groups contain from 4 to 8 carbon atoms, particularly when these are n-butyl or n-octyl groups. The most preferred esters for present use are tri-n-butyl phosphate, tri-n-octyl phosphate, di-n-butyl phosphite and di-n-octyl phosphite.

As stated previously, the organotin halide for use in the process of the invention is a chloride, bromide or iodide containing 1, 2 or 3 hydrocarbon groups (including substituted hydrocarbon groups) bonded to the tin atom. Preferably the halide is a bromide or iodide since these are more reactive than the chlorides and preferably the organotin halide is an alkyltin halide, especially one having from 4 to 8 carbon atoms in the alkyl group or groups. Often the organotin halide will be a dihalide since this can give rise to the di-organotin diesters and oxides which are preferred in commercial usage.

The present process is usually carried out under the influence of heat and it is often necessary to heat the reactants to a temperature of 100° C. to promote the reaction at an adequate rate. The reaction temperature may be as high as 300° C. or even higher, depending upon the reactivity of the organotin halide and the ester involved and the reaction time. The reactants may be simply heated together in the liquid phase or may be diluted by the use of inert solvents, for example ethers or halogenated hydrocarbons. The reactions may be carried out batchwise or continuously, though continuous reaction is preferred. The alkyl halide formed is normally the lowest boiling component of the reaction mixture and may, therefore, be continually removed therefrom by distillation. The organotin phosphorous-containing ester product may be separated from the reaction mixture by the usual methods of filtration, extraction or distillation as appropriate, or if desired it may be hydrolysed in situ to the corresponding oxide by the action of an aqueous alkali.

The invention may, if desired, be carried out in the presence of an esterification catalyst such as, for example, a tertiary organic base such as pyridine, a metal such as copper, mercury, aluminium, silver or titanium, or a salt thereof, or a non-oxidizing acid.

Instead of or in addition to the phosphate or phosphite ester there may be employed in the process of the invention the components thereof, that is a mixture of the relevant acid and alcohol in substantially the appropriate molecular proportions, whereupon the ester is probably initially formed in situ in the reaction mixture before reaction with the organotin halide. Thus there may be employed a mixture of an alcohol and phosphoric or phosphorous acids. However, the use of the components of the ester results in a decrease in the efficiency of the reaction and is therefore less preferred unless outweighted by economic or operational considerations.

Mixtures of phosphate and/or phosphite esters and/or the components thereof may be employed if desired, though the products will then comprise a mixture of alkyl halides and/or a mixture of organotin phosphorous-containing esters. Mixtures of organotin esters are not any disadvantage when they are subsequently to be hydrolyzed to form the corresponding oxide and in such instances it may be desirable in certain circumstances to employ a mixture of phosphate and/or phosphite esters and/or the components thereof in order to achieve the maximum yield of product consistent with economic consumption of reactants.

The invention will now be illustrated by the following examples.

*Example 1.—Reaction of di-n-butyltin di-iodide with tri-n-butyl phosphate*

Di-n-butyltin di-iodide (43.5 g.) and tri-n-butyl phosphate (19.5 g.) were placed in a flask fitted with a condenser set for distillation and an inlet tube for introducing nitrogen. A slow stream of nitrogen was passed through the mixture. On heating butyl iodide distilled off rapidly. Heating was continued until no more butyl iodide distilled off (1¼ hours) to give a white solid residue (22.5 g.) of di-n-butyltin phosphate and a distillate (35.7 g.) of n-butyl iodide.

*Example 2.—Reaction of di-n-butyltin di-iodide with tri-n-butyl phosphate*

Di-n-butyltin di-iodide (73 g.) and tri-n-butylphosphate (31 g.) were placed in a flask fitted with a condenser for distillation, an inlet tube for introducing nitrogen and a thermometer. The flask was heated in an oil bath. On heating butyl iodide started to distil when the temperature in the reactants was 165° C. The temperature was raised to 200° C. during one hour and then from 200° to 235° C. during a further 1½ hours. The residue in the flask (46 g.) was a very viscous almost colourless liquid at 235° C. which solidified on cooling. A distillate of n-butyl iodide (50.5 g.) was obtained. The flask residue of di-n-butyltin phosphate was dissolved in ethanol (100 ml.) and the solution treated with a solution of sodium hydroxide (15 g.) in water (100 ml.) to give after filtration and drying di-n-butyltin oxide (29.0 g.).

*Example 3.—Preparation of di-n-butyltin di-iodide from metallic tin and n-butyl iodide followed by reaction with tri-n-butyl phosphate*

A mixture of stannous iodide, di-n-butyltin di-iodide, butanol and n-butyl iodide was prepared according to the method described in Japanese Patent No. 7810/60 by stirring together and heating under reflux for 2 hours followed by cooling a mixture of tin (30 g.), n-butyl iodide (102 g.), n-butyl alcohol (4.5 g.) and magnesium (0.1 g.).

The reaction flask was fitted with an inlet tube for passing nitrogen, a thermometer, and condenser adjusted for distillation. Tri-n-butyl phosphate (66.5 g.) was added and the mixture stirred and heated to 160° C. when distillation of butyl iodide commenced. A slow stream of nitrogen was passed through the reaction flask to assist removal of the butyl iodide. Over a period of 2¾ hours the temperature was gradually raised to 200° C. after which time no more butyl iodide distilled off. n-Butyl iodide (98 g.) was obtained. The residue in the reaction flask (99.2 g.), largely the di-n-butyltin ester of mono-n-butylphosphoric acid, was an almost colourless viscous liquid at 200° C. This was dissolved in a 9:1 mixture of methylated spirits and concentrated hydrochloric acid and the solution treated with sodium hydroxide solution in 50% aqueous alcohol to give di-n-butyltin oxide (53 g.).

When the process was repeated with similar quantities of reactants, the yield of n-butyl iodide was 103.4 g. and of di-n-butyltin oxide 59.5 g.

*Example 4.—Reaction of di-n-butyltin dibromide with tri-n-butyl phosphate*

Di-n-butyltin dibromide (78.6 g.) and tri-n-butyl phosphate (53.2 g.) were mixed together in a flask fitted with a stirrer, a nitrogen tube inlet, thermometer and condenser arranged for distillation. A slow stream of nitrogen was passed through the liquid which was stirred and heated at 190–200° C. by an oil bath for 5½ hours. During this time, an n-butyl bromide distillate (51.0 g.) was collected (partly in a trap cooled to −80° C.). The residue in the flask (77 g.) was the di-n-butyltin ester of mono-n-butyl phosphoric acid. Treatment of this residue with sodium hydroxide (64 g.) dissolved in methylated spirits (144 ml.) and water (432 ml.) gave di-n-butyltin oxide (47.0 g.).

*Example 5.—Reaction of di-n-butyltin di-iodide with di-n-butyl phosphite*

Di-n-butyltin di-iodide (49 g.), di-n-butyl phosphite (21 g.) and phosphoric acid (2 drops density 1.75) were mixed in the apparatus used in Example 2. The temperature of the reactants was raised to 180° C. for 2 hours at the end of which time n-butyl iodide distillation had ceased and the residue in the flask had set to a frothy pale yellow solid. There was obtained 32.5 g. of n-butyl iodide and a flask residue of 35 g. Hydrolysis of the flask residue as in Example 2 gave 30.0 g. di-n-butyltin oxide.

*Example 6.—Reaction of di-n-butyltin dichloride with di-n-butyl phosphite*

Di-n-butyltin dichloride (100 g.) and di-n-butyl phosphite (73.4 g.) were mixed together in the apparatus described in Example 4, except that the final cold trap at −80° C. was omitted. During the distillation time of 5½ hours at 190–200° C. an n-butyl chloride distillate of 60.6 g. was collected. The residue in the flask (112.6 g.) was a sticky solid at room temperature. It was dissolved in a mixture of methylated spirits (300 ml.) and concentrated hydrochloric acid (30 ml.) and the solution added to a solution of sodium hydroxide (90 g.) in water (150 g.) to obtain 57.8 g. of di-n-butyltin oxide.

When the process was repeated employing a cold trap at −80° C. to remove the last traces of n-butyl chloride from the nitrogen stream passing through the apparatus the yield of n-butyl chloride distillate increased to 108.5 g.

*Example 7.—Reaction of di-n-butyltin dibromide with di-n-butyl phosphite*

The apparatus and method of Example 4 were employed to react di-n-butyltin dibromide (73.4 g.) with di-n-butyl phospite (38.8 g.) There was obtanied a distillate of n-butyl bromide (51.0 g.) and a flask residue of 67 g. This residue was hydrolysed as in Example 4 to produce di-n-butyltin oxide (46.0 g.)

*Example 8.—Reaction of di-n-butyltin dibromide with di-(2-ethylhexyl) phosphite*

The method and process of Example 4 were employed to react di-n-butyltin dibromide (78.4 g.) with di-(2-ethylhexyl) phosphite, but using a reaction temperature of 220° C. There was obtained a distillate of 2-ethylhexyl bromide (79 g.) and a flask residue of 60.5 g.

*Example 9.—Reaction of di-n-butyltin di-iodide with n-butyl alcohol and phosphoric acid*

Di-n-butyltin di-iodide (58 g.), phosphoric acid (25 g. of 100% acid) and n-butyl alcohol (100 g.) were mixed and heated to reflux temperature (122° C.). Di-n-butyl phosphite (5.0 g.) was added. During a period of 11 hours a mixture of n-butyl iodide and n-butyl alcohol was distilled off. When the temperature of the reactants reached 140° C. three further additions of n-butyl alcohol (50 g.) were made.

A total distillate of 218 g. was obtained which was a mixture of n-butyl alcohol and n-butyl iodide. The residue was a colourless liquid.

As many embodiments of this invention may be made without departing from the spirit and scope thereof, it is to be understood that the invention includes all such modifications as come within the scope of the appended claims.

What we claim is:

1. The process which comprises mixing (i) an organotin halide having the formula $R_nSnX_{4-n}$ wherein R is a hydrocarbon radical, X is halide selected from the group consisting of chlorine bromine and iodine, and $n=1-3$ with (ii) a phosphorus-containing ester selected from the group consisting of trialkyl phosphate and dialkyl phosphite esters; heating the so-formed reaction mixture to at least about 100° C., thereby forming alkyl halide and organotin ester; and separating said alkyl halide from said reaction mixture.

2. The process as claimed in claim 1 wherein said reaction mixture is treated with an aqueous alkali, thereby hydrolyzing it to an organotin oxide compound, before said separation of alkyl halide.

3. The process as claimed in claim 2 wherein the phosphorus-containing ester is tri-n-butyl phosphate.

4. The process as claimed in claim 2 wherein the phosphorous-containing ester is tri-n-octyl phosphate.

5. The process which comprises mixing (i) an organotin halide having the formula $R_nSnX_{4-n}$ wherein R is an alkyl radical of 1-8 carbon atoms, X is halide selected from the group consisting of chlorine, bromine or iodine and $n=1-3$ with (ii) a phosphorus-containing ester selected from the group consisting of trialkyl phosphate and dialkyl phosphite esters wherein alkyl contains 1-8 carbon atoms; heating the so-formed mixture to at least about 100° C., thereby forming alkyl halide and organotin ester; and separating said alkyl halide from said reaction mixture.

6. The process as claimed in claim 5 wherein alkyl and R are the same.

7. The process as claimed in claim 6 wherein halide is iodide.

8. The process as claimed in claim 6 which also comprises mixing (iv) an esterification catalyst selected from the group consisting of tertiary organic bases, non-oxidizing acids, metallic copper, mercury, aluminium, silver and titanium, and salts of said metals.

9. The process as claimed in claim 6 wherein said reaction mixture is treated with an aqueous alkali, thereby hydrolyzing it to an organotin oxide compound, before said separation of alkyl halide.

10. In the process for preparing alkyltin halide by the reaction of alkyl iodide with metallic tin, the improvement which comprises mixing the alkyltin iodide product with a phosphorus-containing ester selected from the group consisting of trialkyl phosphate and dialkyl phosphite esters; heating the so-formed reaction mixture to at least about 100° C. thereby forming alkyl halide and alkyltin ester; separating said alkyl halide from said reaction mixture and recycling at least a portion of said alkyl halide to said reaction with said metallic tin.

11. The process of claim 10 wherein alkyl contains 1-8 carbon atoms.

12. The process of claim 11 wherein all alkyl groups are the same.

13. The process of claim 11 which also comprises mixing the alkyltin iodide product with an esterification catalyst selected from the group consisting of tertiary organic bases, non-oxidising acids, metallic copper, mercury, aluminium, silver and titanium, and salts of said metals.

14. The process of claim 12 wherein the phosphorus-containing ester is tri-n-butyl phosphate.

15. The process of claim 12 wherein the phosphorus-containing ester is tri-n-octyl phosphate.

No references cited.

HELEN M. McCARTHY, *Primary Examiner.*

W. F. W. BELLAMY, *Examiner.*